No. 667,798. Patented Feb. 12, 1901.
C. SEYBOLD.
FRICTION CLUTCH.
(Application filed May 19, 1900.)

(No Model.) 2 Sheets—Sheet 1.

Witnesses
R. V. Hazlitt,
H. S. Kyle.

Inventor
Charles Seybold
by Alfred M. Allen
Attorney

No. 667,798. Patented Feb. 12, 1901.
C. SEYBOLD.
FRICTION CLUTCH.
(Application filed May 19, 1900.)
(No Model.) 2 Sheets—Sheet 2.

Witnesses

Inventor
Charles Seybold
by Alfred M. Allen.
Attorney

UNITED STATES PATENT OFFICE.

CHARLES SEYBOLD, OF DAYTON, OHIO.

FRICTION-CLUTCH.

SPECIFICATION forming part of Letters Patent No. 667,798, dated February 12, 1901.

Application filed May 19, 1900. Serial No. 17,200. (No model.)

*To all whom it may concern:*

Be it known that I, CHARLES SEYBOLD, a citizen of the United States, residing at Dayton, in the county of Montgomery and State of Ohio, have invented certain new and useful Improvements in Friction-Clutches, of which the following is a full, clear, and exact description, reference being had to the accompanying drawings, forming part of this specification.

My invention relates to friction-clutches for coupling together rotating shafts, pulleys, and the like, and it has particular relation to that class of friction-clutches in which a split band attached to one of the members is expanded within the rim on the other member to couple the two parts together. With this class of clutches two difficulties are met with. When it is sought to couple a fly-wheel or pulley with a shaft in this way, the centers of the pulley and the expansion-band will in the start be the same; but the pulley-bearings soon wear slightly, so that the centers do not exactly coincide, and consequently when the split band is expanded to grasp the rim of the pulley the clutch-band has to bear the full weight of the pulley or fly-wheel, and the two centers not coinciding there is a slight wabbling or uneven rotation of the parts, which very largely increases the wear of the bearings. In addition to this when the split band is expanded to grasp the rim of the pulley the band is no longer a true circle, but is slightly elongated by the expansion. It follows that the clutch does not grasp the rim of the pulley throughout its periphery, and consequently the power of the clutch is very much weakened.

It is the purpose of my invention to overcome these objections by the substitution for the fixed pulley-rim of a rim or band loosely fitted and secured to the pulley, within which rim the expansion-band is located. The looseness of fit of this additional pulley-rim is sufficient to allow the rim to accommodate itself to the difference in the centers of the rotating parts, so that the weight of the fly-wheel or pulley will no longer be thrown on the expansion-band, and in addition to this there is sufficient elasticity in this loosely-fitting rim to allow it to accommodate itself to the slightly-elliptical shape of the split band when expanded.

Figure 1:
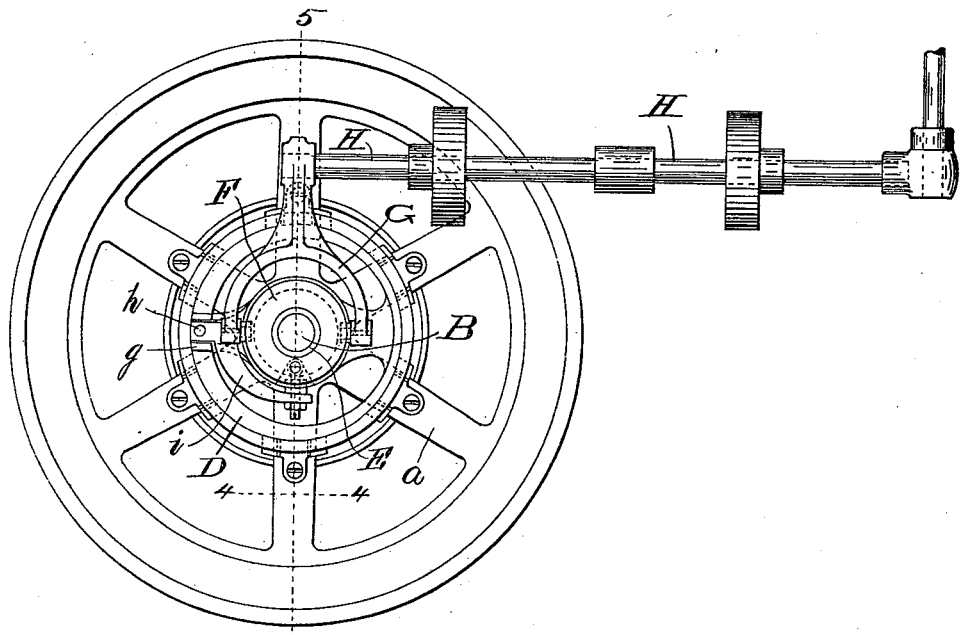
Figure 2:
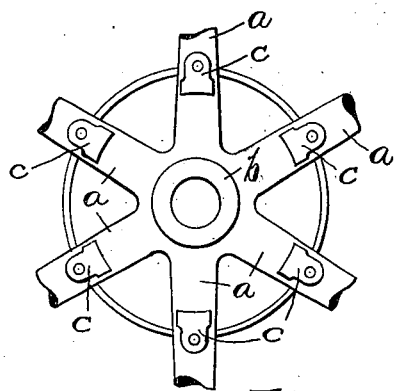
Figure 3:
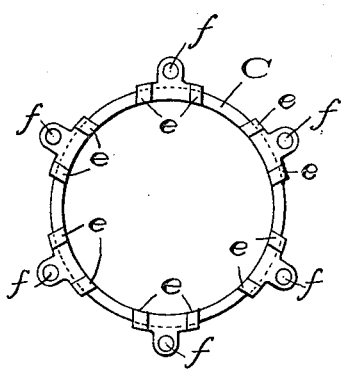
Figure 4:
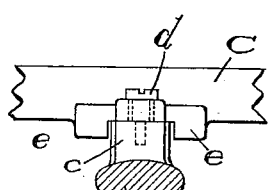
Figure 5:
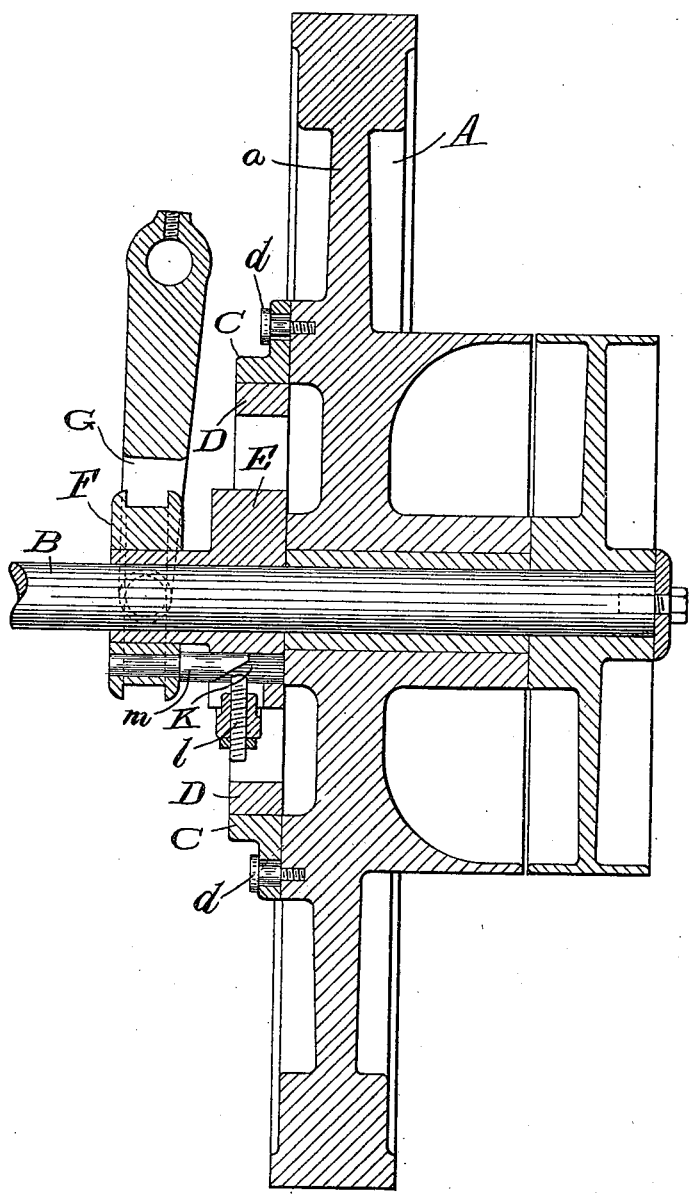

In the drawings, Figure 1 is a front elevation of my improved friction-clutch. Fig. 2 is a front view of the central portion of the fly-wheel. Fig. 3 is a front view of the loose fly-wheel rim within which the expansion-band works. Fig. 4 is a detail sectional view on the lines 4 4 of Fig. 1. Fig. 5 is a central vertical section on the lines 5 5 of Fig. 1.

A is a fly-wheel provided with spokes $a$ and hub $b$, mounted on the shaft B. Each of the spokes of the fly-wheel is provided with a lug $c$, and upon these lugs the rim or band C is secured by the screws $d\ d$, the lugs $c\ c$ fitting between the shoulders $e\ e$, formed on the rim C at each point of attachment, but not fitting closely, so that there is a play of from one-sixteenth to one thirty-second of an inch between the vertical faces of the shoulders $e\ e$ and the sides of the lugs $c\ c$, as particularly shown in Fig. 4. The holes $f\ f$ in the attaching-lugs of the rim C are also enlarged around the shanks of the attaching-screws $d$, so that while the screws $d$ hold the rim C on the fly-wheel no strain is brought to bear on the screws. In this way the rim C is attached to the fly-wheel so that there will be sufficient play for the purpose hereinafter described and so that all the strain of the attachment will come on the lugs $c\ c$ and there will be no strain on the attaching-screws.

D is the expansion-band, located within the rim C and secured by its hub E to the shaft B. This band is split at one side and the block $g$ inserted therein and pivoted on a pin $h$, secured to an extension of the hub of the band. This block $g$ carries an arm $i$, provided with a set-screw $l$. Mounted loosely on an extension of the hub of the expansion-band is a sliding collar F, grooved to receive the rollers on the fork G, secured to the shaft H. By rocking the shaft H the sliding collar F will be shifted to and away from the expansion-band. This sliding collar carries a beveled pin $m$, arranged to bear against the inner end of the set-screw $l$ as the sliding collar F is shifted toward the expansion-band. This action presses out the set-screw $l$ and shifts the inner end of the expansion-arm $i$ and rocks the block $g$ to open out the expansion-band. K is a recess formed in the hub E to receive the pin $m$ when thus actuated.

As I have already stated, my invention has particular relation to expansion-band clutches; but in so far as I substitute a loosely-fitting secondary rim instead of the ordinary integral pulley-rim, within which the contact-pieces operate, my invention is equally applicable to all classes of friction-clutches. By means of my loosely-fitted rim I avoid the strain incident to any friction-clutch when the wear on the journal-bearings has destroyed the concentric relation of the centers of the two members to be united by the clutch.

I have illustrated my invention with reference to a fly-wheel; but it will be understood, of course, that the invention is equally applicable to any arrangement of expansion-band clutch. In the construction illustrated it is evident that if the rim of the fly-wheel within which the clutch operates were cast integral therewith the band when expanded to grasp the rim would only grasp it at certain points, as the rim would remain a true circle, while the band would become slightly elliptical. With my construction this rim being loosely fitted possesses sufficient elasticity to accommodate itself to the shape of the band, and a perfect union is secured between the clutch and the rim, so that a very much more powerful clutch is obtained than is possible under the ordinary construction. All this is obtained by the freedom of movement allowed the loosely-fitting rim C.

Having thus described my invention, what I claim, and desire to secure by Letters Patent, is—

1. In a friction-clutch, a rotating and a non-rotating member, a rim or band loosely secured to one member, and a contact-piece secured to the other member contacting with said band to couple the two members together, substantially as described.

2. In a friction-clutch, a rotating and a non-rotating member, a rim or band loosely secured to one member and an expansion-band secured to the other member, with means for expanding the band within the loosely-fitted rim to couple the members, substantially as described.

3. In a friction-clutch, the combination with a shaft and an expansion-band secured thereto, of a fly-wheel loosely mounted on said shaft, and a secondary rim or band for the fly-wheel loosely fitted thereto, within which loosely-fitted rim the expansion-band is mounted, and means for actuating said expansion-band to couple the shaft and fly-wheel, substantially as shown and described.

4. In a friction-clutch, a fly-wheel or pulley carrying lugs on its spokes, and a ring provided with shoulders or projections fitting over said lugs, the space between the projections on the ring being greater than that between the side faces of the lugs, whereby play is permitted said ring, and screws for securing said ring to the fly-wheel, the apertures for which in the ring are enlarged to prevent any strain upon the screws, substantially as shown and described.

CHARLES SEYBOLD

Witnesses:
L. W. JAMES,
EDWARD L. RERUE.